(12) United States Patent
Liu et al.

(10) Patent No.: US 7,540,893 B2
(45) Date of Patent: Jun. 2, 2009

(54) SYSTEM AND METHOD FOR PRODUCING SYNTHESIS GAS

(75) Inventors: Ke Liu, Rancho Santa Margarita, CA (US); Vladimir Zamansky, Oceanside, CA (US)

(73) Assignee: General Electric Company, Niskayuna, NY (US)

( * ) Notice: Subject to any disclaimer, the term of this patent is extended or adjusted under 35 U.S.C. 154(b) by 609 days.

(21) Appl. No.: 11/295,403

(22) Filed: Dec. 6, 2005

(65) Prior Publication Data
US 2007/0124997 A1 Jun. 7, 2007

(51) Int. Cl.
*B01J 8/00* (2006.01)
*B01J 8/18* (2006.01)

(52) U.S. Cl. .......... 48/127.9; 48/198.7; 48/94; 48/128; 48/198.6; 48/198.3; 48/61; 48/197 R; 48/198.5; 422/139; 422/141; 422/142; 422/144; 422/198; 422/187; 422/188

(58) Field of Classification Search ........ 422/139, 422/141, 144, 147
See application file for complete search history.

(56) References Cited

U.S. PATENT DOCUMENTS

| | | | | |
|---|---|---|---|---|
| 3,019,181 A * | 1/1962 | Hayes | ................ | 208/217 |
| 4,268,412 A * | 5/1981 | Miyashita et al. | ........... | 252/373 |
| 4,767,569 A | 8/1988 | Brophy et al. | | |
| 5,624,964 A * | 4/1997 | Cimini et al. | .............. | 518/704 |
| 5,980,782 A | 11/1999 | Hershkowitz et al. | | |
| 6,025,403 A * | 2/2000 | Marler et al. | ............... | 518/703 |
| 2002/0064494 A1 * | 5/2002 | Zeng et al. | ............... | 423/418.2 |

FOREIGN PATENT DOCUMENTS

WO    WO03072490 A1    9/2003

OTHER PUBLICATIONS

Ranjia Li et al., "Partial Oxidation of Methane to Synthesis Gas Using Lattice Oxygen of La1-xSrxFeO3 Perovskite Oxides Instead of Gaseous Oxygen", Presented in 13th International Congress on Catalysis, held in Paris from Jul. 11-16, 2004, 2 pages.

* cited by examiner

*Primary Examiner*—Alexa D. Neckel
*Assistant Examiner*—Kaity V. Handal
(74) *Attorney, Agent, or Firm*—Patrick K. Patnode

(57) ABSTRACT

A system for producing synthesis gas includes a regeneration zone. The regeneration zone includes a first fluidized bed configured to receive an oxidant for producing a regenerated oxygen transfer material. The system further includes a mixed reforming zone comprising a second fluidized bed configured to receive a first fuel and the regenerated oxygen transfer material to produce a first reformate stream and a steam reforming zone comprising a third fluidized bed configured to receive the first reformate stream, a second fuel and steam to produce the synthesis gas. The regeneration zone, mixed reforming zone and steam-reforming zone are in fluid communication with each other.

30 Claims, 4 Drawing Sheets

SYSTEM AND METHOD FOR PRODUCING SYNTHESIS GAS

BACKGROUND OF THE INVENTION

This invention relates to systems and methods for producing synthesis gas. More particularly, this invention relates to systems and methods for producing synthesis gas using fluidized bed reactors without an Air Separation Unit (ASU).

Currently complex industrial plants are built around the globe to produce synthesis gases for use in a variety of applications including conversion of natural gas to useful liquid fuels in a Gas-To-Liquids (GTL) plant, generation of hydrogen gases and other processes. The ASU is typically an integral part of a GTL plant and costs about one third of the capital cost of a GTL plant. Therefore one challenge faced by these complex industrial plants is how to eliminate or reduce the capital expenditure that is required to build ASU in those plants.

Liquid hydrocarbons for fueling different types of engines can be synthesized in Gas-to-Liquid (GTL) plants in which synthesis gas (a mixture of CO and $H_2$) is catalytically converted to liquid fuels. For utilization in such plants, synthesis gas is produced either by homogeneous Partial Oxidation (POX) or by catalytic partial oxidation (CPO) of natural gas (NG) or other hydrocarbons. In the CPO process the hydrocarbons react with oxygen ($O_2$) gas that is separated from air. Cryogenic technology or multiple stage pressure swing adsorption units are typically used to separate $O_2$ from air. The air-separation unit used in today's plants is quite expensive. In addition, the cryogenic process of generating pure $O_2$ from air at the required pressure is energy intensive. The cost of capital and operation of the air separation unit is substantial.

Accordingly, there is a need for a process to produce synthesis gas economically wherein the requirement of the expensive air separation unit is eliminated.

BRIEF DESCRIPTION OF THE INVENTION

In one aspect, a system for producing synthesis gas includes a regeneration zone comprising a first fluidized bed configured to receive an oxidant for producing a regenerated oxygen transfer material and a mixed reforming zone comprising a second fluidized bed configured to receive a first fuel and the regenerated oxygen transfer material to produce a first reformate stream. The system further includes a steam reforming zone comprising a third fluidized bed configured to receive the first reformate stream, steam and a second fuel to produce the synthesis gas. The regeneration zone, mixed reforming zone and steam reforming zone are in fluid communication.

In another aspect, a system for producing synthesis gas includes a regeneration zone comprising a first fluidized bed configured to receive an oxidant for producing a regenerated oxygen transfer material and a mixed reforming zone comprising a second fluidized bed configured to receive a first fuel steam and the regenerated oxygen transfer material to produce a first reformate stream. The system further includes a steam reforming zone comprising a third fluidized bed configured to receive the first reformate stream, a second fuel and steam to produce the synthesis gas. The regeneration zone, mixed zone and steam reforming zone are in fluid communication and the synthesis gas is used for Fischer-Tropsch process.

In yet another aspect a system for producing hydrogen includes a regeneration zone comprising a first fluidized bed configured to receive an oxidant for producing a regenerated oxygen transfer material and a mixed reforming zone comprising a second fluidized bed configured to receive a first fuel steam and the regenerated oxygen transfer material to produce a first reformate stream. The system further includes a steam reforming zone comprising a third fluidized bed configured to receive the first reformate stream, a second fuel and steam to produce a synthesis gas and a shift reaction zone configured to receive the synthesis gas and steam to produce a second reformate rich in hydrogen. The system also includes a separation unit configured to receive the second reformate and produce a substantially pure hydrogen gas. The regeneration zone, mixed zone and steam reforming zone are in fluid communication.

In another aspect, a method for producing a synthesis gas includes regenerating an oxygen transfer material using an oxidant in a regeneration zone comprising a first fluidized bed and producing a first reformate in a mixed reforming zone comprising a second fluidized bed configured to receive a first fuel steam and a regenerated oxygen transfer material. The method further includes steam reforming the first reformate in a steam reforming zone comprising a third fluidized bed configured to receive a second fuel and steam to produce the synthesis gas. The regeneration zone, mixed zone and steam reforming zone are in fluid communication.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
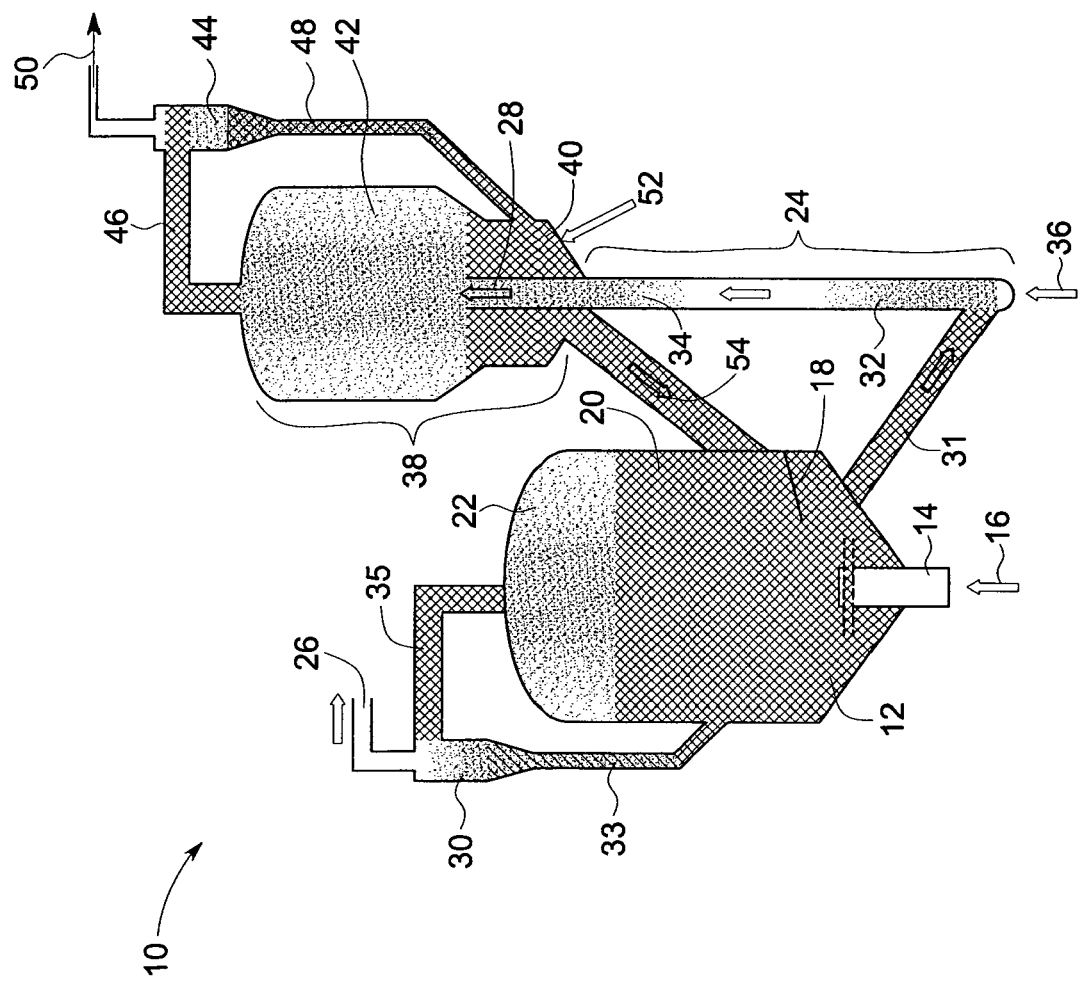
FIG. 1 is a schematic diagram of an exemplary synthesis gas production system.

FIG. 1 represents an exemplary system 10 for producing synthesis gas. The system 10 includes a regeneration zone 12 and a mixed reforming zone 24. The regeneration zone 12 includes a first fluidized bed 20 configured to receive an oxidant 16 for producing a regenerated oxygen transfer material (OTM). The mixed reforming zone 24 includes a second fluidized bed configured to receive a fuel 36 (natural gas or liquid fuels), with a portion of steam and the regenerated OTM to produce a first reformate stream 28. The steam may be mixed with the fuel 36 as shown in FIG. 1 or it can be introduced in the mixed reforming zone 24 separately. The system 10 further includes a steam-reforming zone 38. The steam reforming zone 38 comprises a third fluidized bed that includes a dilute bed 42, which dilute bed 42 has a low density of the particulates and a dense bed 40 with a high density of particulates. The third fluidized bed 38 is configured to receive the first reformate stream 28, and steam 52 to produce the synthesis gas 50. The regeneration zone 20, mixed zone 24 and steam reforming zone 38 are in fluid communication with each other. In one embodiment, the mixed reforming zone 24 promotes both catalytic partial oxidation (CPO) and steam reforming reactions.

The regeneration zone 12 further includes a solid separator 30 in fluid communication with the regeneration zone 12. In one embodiment, as shown in FIG. 1, the solid separator 30 is a cyclone separator, which is connected to the regeneration zone 12 via two conduits 33 and 35. The oxidant (typically air) 16 is introduced in the regeneration zone 12 through an opening 14. The pressure of the oxidant keeps the first fluidized bed 20 under the required fluidized condition. The pressure of the oxidant should be sufficient enough to generate a high velocity for the fuel, the gases produced in the reforming reaction and the OTM and catalyst particle. The OTM reacts with the oxidant 16 and generates an oxygen-depleted stream 26. The OTM is carried by the oxidant-depleted stream 26 and is separated by the cyclone separator 30. Once separated; the OTM is fed back to the regeneration zone 12 via the conduit 33.

The system 10 produces synthesis gas using the oxygen content of the OTM. The OTM is capable of going through cycles of reduction reaction and oxidation reaction. In the reduction reaction, the fuel 36 is oxidized by the oxygen in the OTM in the mixed reforming zone 24, and in the subsequent oxidation reaction, the reduced OTM is oxidized by the oxidant 16 in the regeneration zone 12 or vice versa. The OTM is the primary source of oxygen to oxidize the fuel 36 supplied to the mixed reforming zone 24. Optionally, additional oxidant gas may also be supplied to the mixed reforming zone to supplement the primary source of oxidant derived from the OTM.

Typically the OTM is a metal oxide comprising at least one metal selected from the group consisting of nickel (Ni), magnesium (Mg), molybdenum (Mo), manganese (Mn), iron (Fe), chromium (Cr), copper (Cu), zinc (Zn), cobalt (Co), cerium (Ce), and combinations thereof. In some embodiments, the OTM forms inorganic metal oxides once it reacts with the oxidant 16. The inorganic metal oxides used as the OTM may be binary or ternary metal oxides or mixtures thereof. The binary metal oxides include, but are not limited to, e.g., chromium oxide, cobalt oxide, nickel oxide, titania, copper oxide, manganese oxide, iron oxide, or mixtures thereof. In some embodiments, the inorganic metal oxide is used with a conventional support material, for example alumina.

To promote the reforming reactions in the mixed reforming zone 24 and steam-reforming zone 38, the OTM comprises the catalysts for the catalytic partial oxidation or steam methane reforming reactions. In one embodiment, a catalytic partial oxidation (CPO) catalyst is loaded via ion-exchange process onto the OTM and introduced in the fluidized bed 20. In another embodiment, the particles of OTM may be physically mixed with the CPO catalyst particles. In another embodiment, a CPO catalyst can be wash-coated onto the OTM. As shown in FIG. 1, in operation, the OTM flows under gravity to the mixed reforming zone 24 through a first conduit 31. In one embodiment, the mixed reforming zone 24 includes a riser tube. As discussed earlier, the mixed reforming zone 24 promotes both catalytic partial oxidation and steam reforming reactions. The riser tube as shown in FIG. 1, includes a first portion that is typically a catalytic partial oxidation zone 32. The second portion of the riser tube is a steam-reforming zone 34, wherein the heat generated by the catalytic partial oxidation reaction is used in the endothermic steam reforming process. In the catalytic partial reaction, the oxygen released from the OTM partially oxidizes the hydrocarbon fuel 16 in an exothermic process. The temperature in the catalytic partial oxidation zone 32 is in the range of about 650 to about 1200 Deg. C. Fine catalyst particles along with the OTM are fluidized by the gases produced from the CPO and steam reforming reactions in the riser tube and enter the steam-reforming zone 38 along with the first reformate stream 28.

The primary reactions that occur over the CPO catalyst in the mixed reforming zone 24 to generate the first reformate 28 are indicated in reactions 1-3 below:

$$CH_4 + 1/2 O_2 = CO + 2H_2; \quad (1)$$

$$CH4 + 1.5 O2 = CO + 2H2O \quad (2)$$

$$CH_4 + 2O_2 = CO_2 + 2H_2O \quad (3)$$

In operation, the first reformate 28 from the mixed reforming zone 24 is introduced in the steam reforming zone 38. Conventional steam reforming process is energy intensive and significant heat is needed in the overall reforming process. The main constituent of natural gas is methane ($CH_4$) that reacts with steam in a two-step reaction to produce hydrogen. In accordance with the present technique as shown in FIGS. 1, natural gas is converted to hydrogen following the reactions (4) and (5) as mentioned below.

$$CH_4 + H_2O \Leftrightarrow CO + 3H_2 \quad (4)$$

$$CO + H_2O \Leftrightarrow CO_2 + H_2 \quad (5)$$

The first reaction (4) as described above typically takes place in the steam-reforming zone 38 (within the dilute bed 42 and the dense bed 40) and upper zone of the riser 34, wherein the fuel such as methane reacts with steam to produce carbon monoxide and hydrogen. In some embodiments the water-gas-shift reaction forming carbon dioxide ($CO_2$) may also occur depending on the availability of steam. In one embodiment, the synthesis gas 50 generated from the upper zone of the riser 34 and the steam-reforming zone 38 comprises carbon monoxide (CO), carbon dioxide ($CO_2$) and hydrogen ($H_2$).

In some embodiments, the steam-reforming zone 38 may also be operated without additional steam feed 52. However, in the absence of additional steam, the steam reforming reaction utilizes the steam generated through the reforming reactions (2-3) in the mixed reforming zone 24. However, in certain embodiments as shown in FIG. 1, it is desirable to supply additional steam to the reformer to provide enhanced steam reforming activity. The steam reforming may further proceed in a solid separator 44 that is in fluid communication with the steam-reforming zone 38. In one embodiment, as shown in FIG. 1, the solid separator 44 is a cyclone separator, which is connected to the steam-reforming zone 38 via two conduits 46 and 48. The OTM and the catalyst particles are collected in the dense bed 40. The dense bed 40 serves for cooling the catalyst to the temperature of about 500 Deg. C. Steam 52 may be injected in the dense bed 40 or with the fuel 36. An additional second fuel may also be added in the dense bed 40 of the steam reforming zone 38 to enhance the steam reforming reaction. The second fuel may be added separate to the dense bed 40 or added along with the steam 52. The endothermic steam reforming process takes place in the dense bed 40 on the surface of the hot catalyst particles. This endothermic steam reforming reaction cools the catalyst particles from about 1100 Deg. C. to about 500 Deg. C. Operationally, once the catalyst particles are sufficiently cooled in the dense bed 40, the particles flow down to the regeneration zone 12 via gravity through a second conduit 54.

The reduced OTM along with catalyst particles are introduced into the regeneration zone 12 through the second conduit 54 for regeneration. The oxygen present in the oxidant 16 flowing through the regeneration zone 12 again reacts with the reduced OTM and increases the temperature of the oxygen catalyst to about 700 Deg. C. In the CPO zone 32, the temperature of the catalyst increases from about 700 Deg. C. to about 1100 Deg. C., and goes to the next oxidation reduction cycle.

As discussed earlier, the inorganic metal oxide may or may not be active for catalyzing reforming reactions. If a given inorganic metal oxide used in the process described above is not active for the steam reforming reaction, a second catalytic component, for example a nickel catalyst, that is active for steam reforming reaction may be added. This second component can be placed on the same carrier particle as the inorganic metal oxide or on a separate carrier particle. The partial oxidation catalyst materials may also be used with the inorganic metal oxides, including, but not limited to palladium (Pd), platinum (Pt), ruthenium (Ru), iridium (Ir), rhodium (Rh), cobalt (Co) or mixtures thereof. Various metal combinations also known in the art may also be used as catalyst materials with the inorganic metal oxides, including, but not limited to, nickel/cobalt, nickel/platinum, and the like. The catalyst is produced by a spry-drying process followed by calcination at the temperature range of about 500 Deg. C. to about 1000 Deg. C. The noble metal such as Pd can be introduced onto the catalyst particles either before or after the spry drying process. For use in the fluidized beds, the particle sizes of the OTM is generally in the range between about 10 to about 300 microns, and more specifically between about 40 to about 150 microns. In some embodiment, the OTM may be configured to perform more than one function. The functions of the OTM are oxygen transfer, $CO_2$ adsorption, and catalyst for the CPO reaction and catalyst for the steam reforming reaction. In some embodiments, the OTM may only transfer oxygen. In some other embodiments. OTM may function as a catalyst as well as an oxygen transfer material.

In some embodiments, optionally, fine particles of carbon dioxide ($CO_2$) adsorbents can be added to the catalyst to remove the $CO_2$ formed in the reforming reactions. Typically calcium oxide (CaO) is used for many industrial processes for adsorbing $CO_2$ produced in the reforming reactions. The utilization of CaO is low due to the calcium carbonate ($CaCO_3$) eggshell formation that prevents further utilization of CaO in a relative big CaO particle (in the range of about 1 to 3 mm). The big CaO particles become fines after many chemical cycles between CaO and $CaCO_3$. In conventional adsoption process, another metal oxide is introduced as a binder to avoid the CaO fines formation. But the cost of $CO_2$ adsorbent increases significantly due to this modification. In the current technique as described in the preceding sections, instead of trying to avoid the CaO fines formation, the system design and the process catalyst system are adjusted to effectively utilize CaO fines as the $CO_2$ adsorbent. Instead of avoiding fines, the disclosed process effectively uses catalyst fines and CaO fines in the size range from about 20 micron to about 150 micron. The $CO_2$ adsorption material is configured to capture $CO_2$ in the reforming zone releasing heat of $CO_2$ adsorption. The $CO_2$ adsorption material capture $CO_2$ in the reforming zones 24 and 38 based on reaction forming a carbonate such as, $$CO_2 + CaO \rightarrow CaCO_3 \quad (6),$$

and release $CO_2$ in the regeneration zone 12 based on reaction:

$$CaCO_3 \rightarrow CaO + CO_2 \quad (7).$$

The heat of $CO_2$ adsorption (from reaction 6) also helps to drive the endothermic steam reforming reaction in the steam-reforming zone 38. Other metal oxides forming carbonates in reaction with $CO_2$ can be also utilized.

The types of fluidized bed processes that can be used herein include fast fluid beds and circulating fluid beds. The circulation of the OTM can be achieved in either the up flow or down flow modes. A circulating fluid bed is a fluid bed process whereby inorganic metal oxide and any other particles are continuously removed from the bed (whether in up flow or down flow orientation) and are then re-introduced into the bed to replenish the supply of solids. At lower velocities, while the inorganic metal oxide is still entrained in the gas stream, a relatively dense bed is formed in the systems described above. This type of bed is often called a fast fluid bed.

The hydrocarbon fuels that can be used in accordance with the present technique includes, but are not limited to natural gas, methane, methanol, ethanol, ethane, liquid petroleum gas (LPG), naphthas, typically virgin naphthas or cracked naphthas, such as, e.g., light naphthas, full range naphthas or even heavy naphthas, butane, propane, diesel fuel, kerosene, an aviation fuel, a coal derived fuel, a bio-fuel, gas oil, crude oil, an oxygenated hydrocarbon feedstock, refinery off gas, associated gas, and combinations thereof. The synthesis gas 50 resulting from the reforming process described in the previous sections typically comprises hydrogen, carbon monoxide, carbon dioxide, steam. In one embodiment, the synthesis gas may include a small amount of nitrogen ($N_2$) carried to the reforming zones 24 and 38 from the regeneration zone 12. In some embodiments, the synthesis gas further comprises unreacted fuel.

The oxidant used in the disclosed systems may comprise any suitable gas containing oxygen, such as for example, air, oxygen rich air or oxygen-depleted air.

Figure 2:
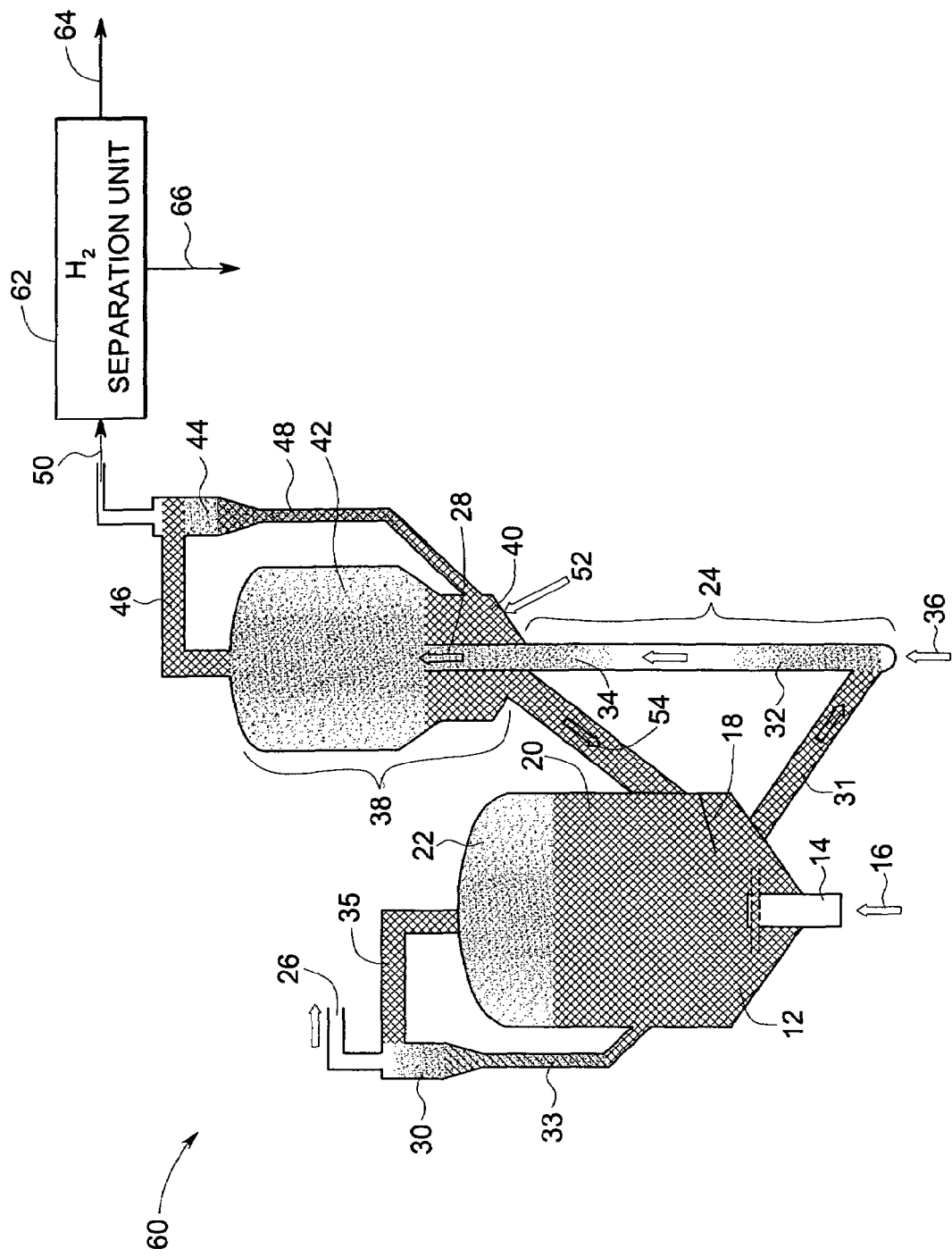
FIG. 2 is a schematic diagram of an exemplary synthesis gas production system integrated with a hydrogen production system.

FIG. 2 represents an exemplary system 60 for producing hydrogen; wherein the synthesis gas 50 is produced as described in the preceding section is fed into a hydrogen separation unit 62. The hydrogen separation unit 62 is configured to receive the synthesis gas 50 and generate a substantially pure hydrogen stream 64 and an off gas stream 66. Since there is no separate water-gas-shift reactor included in the system, in some embodiments, the off gas stream 66 may also include CO along with the unconverted fuel, which off gas stream may be combusted in a gas turbine system (not shown) for power generation.

Figure 3:
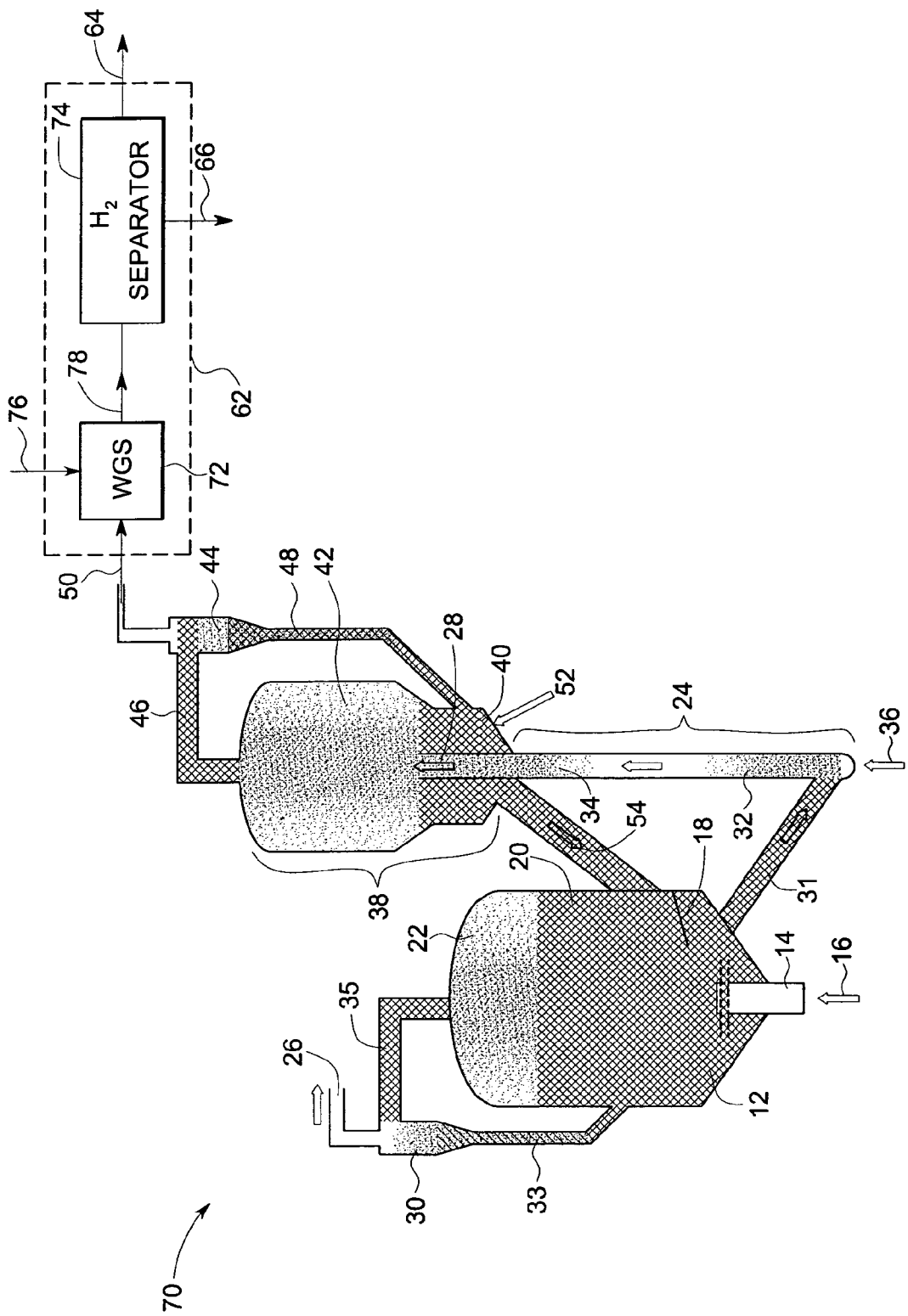
FIG. 3 is a schematic diagram of yet another exemplary synthesis gas production system integrated with a hydrogen production system and FIG. 4 is a schematic diagram of an exemplary synthesis gas production system integrated with a Fischer-Tropsch process.

FIG. 3 shows yet another exemplary system 70 for producing hydrogen gas. As shown in FIG. 3 in one embodiment, the hydrogen separation unit 62 further includes a water gas shift (WGS) reaction zone 72 and a hydrogen separator 74. The synthesis gas 50 is sent to the shift reaction zone 72, wherein in the presence of a shift catalyst, the carbon monoxide and steam in the stream 50 is converted to carbon dioxide and hydrogen and generates a third reformate stream 78 rich in hydrogen based on reaction (5) mentioned above. Shift catalyst may include a high temperature shift catalyst (HTS) or a low temperature shift catalyst (LTS) or a combination of HTS and LTS catalysts. The third reformate gas stream 78 rich in hydrogen is further treated in a hydrogen separator 74 to generate a hydrogen rich product stream 64 and an off-gas 66. The off-gas 66 typically comprises unconverted fuel, carbon monoxide, and carbon dioxide. The hydrogen separation process may apply various techniques known in the art, including but not limited to pressure swing adsorption, chemical absorption and membrane separation to generate the hydrogen product gas stream 64.

The methods to separate hydrogen from other gases to produce the hydrogen rich product stream 64 include pressure swing adsorption (PSA) and membrane separation. Pressure swing adsorption (PSA) may be used for separation of hydrogen from a mixture of gases containing hydrogen. In PSA techniques, at a high partial pressure, solid molecular sieves can adsorb gases such as carbon dioxide more strongly than hydrogen. As a result, at elevated pressures, gases other than hydrogen are removed selectively from the mixture of gases comprising hydrogen when this mixture is passed through an adsorption bed. Regeneration of the bed is accomplished by depressurization and purging. Typically for critical operations, a plurality of adsorption vessels are used for continuous separation of hydrogen, wherein one adsorption bed is used while the others are regenerated.

In one embodiment, a membrane separation unit may be used in the hydrogen separator 74. A variety of palladium (Pd) and Pd-Silver alloys may be used for $H_2$ selective membranes, which membranes operate at relatively low temperatures. In one embodiment, the separation efficiency of the separator 74 can be enhanced by combining a PSA unit with $CO_2$ separation membranes. In the first step $H_2$ is separated by a PSA technique. In the next step, $CO_2$ is separated by $CO_2$ selective membranes. Some polymeric membranes show good permeability and selectivity for $CO_2$ separation at relatively low temperatures.

In another embodiment, for $H_2$ rich gas, the hydrogen separator may use a cryogenic separation technique. In one embodiment, the third reformate gas stream 78 from the shift reactor 72 is compressed to approximately 900 psia and then cooled to room temperature using a condenser, which condenser liquefies the $CO_2$. Hydrogen can be recovered as a gas from this process, while the $CO_2$ is removed as liquid from the bottom of the condenser.

Another technique for purification of the third reformate gas steam 78 includes separation of carbon dioxide from the third reformate gas stream 78 by chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which generates CaO and $CO_2$.

Yet another technique used for separation of $CO_2$ from the third reformate gas stream 78 may include, but is not limited to, chemical absorption of $CO_2$ using amines. The third reformate gas stream 78 is cooled to a suitable temperature to make use of chemical absorption of carbon dioxide using amines. This technique is based on alkanol amine solvents that have the ability to absorb carbon dioxide at relatively low temperatures, and are easily regenerated by raising the temperature of the rich solvents. The solvents used in this technique may include, for example, triethanolamine, monoethanolamine, diethanolamine, diisopropanolamine, diglycolamine, and methyldiethanolamine.

The hydrogen produced in the processes described above may be used for power generation (such as fuel cell or turbine) or may be transported in gaseous or liquid form. In FIGS. 1-2, the purification system 62 produces the hydrogen rich product gas that may be used in applications requiring pure hydrogen. However the third reformate gas stream 78 from the shift zone 72 also comprises substantial amount of hydrogen and may be used for applications where high purity of hydrogen is not required.

Figure 4:
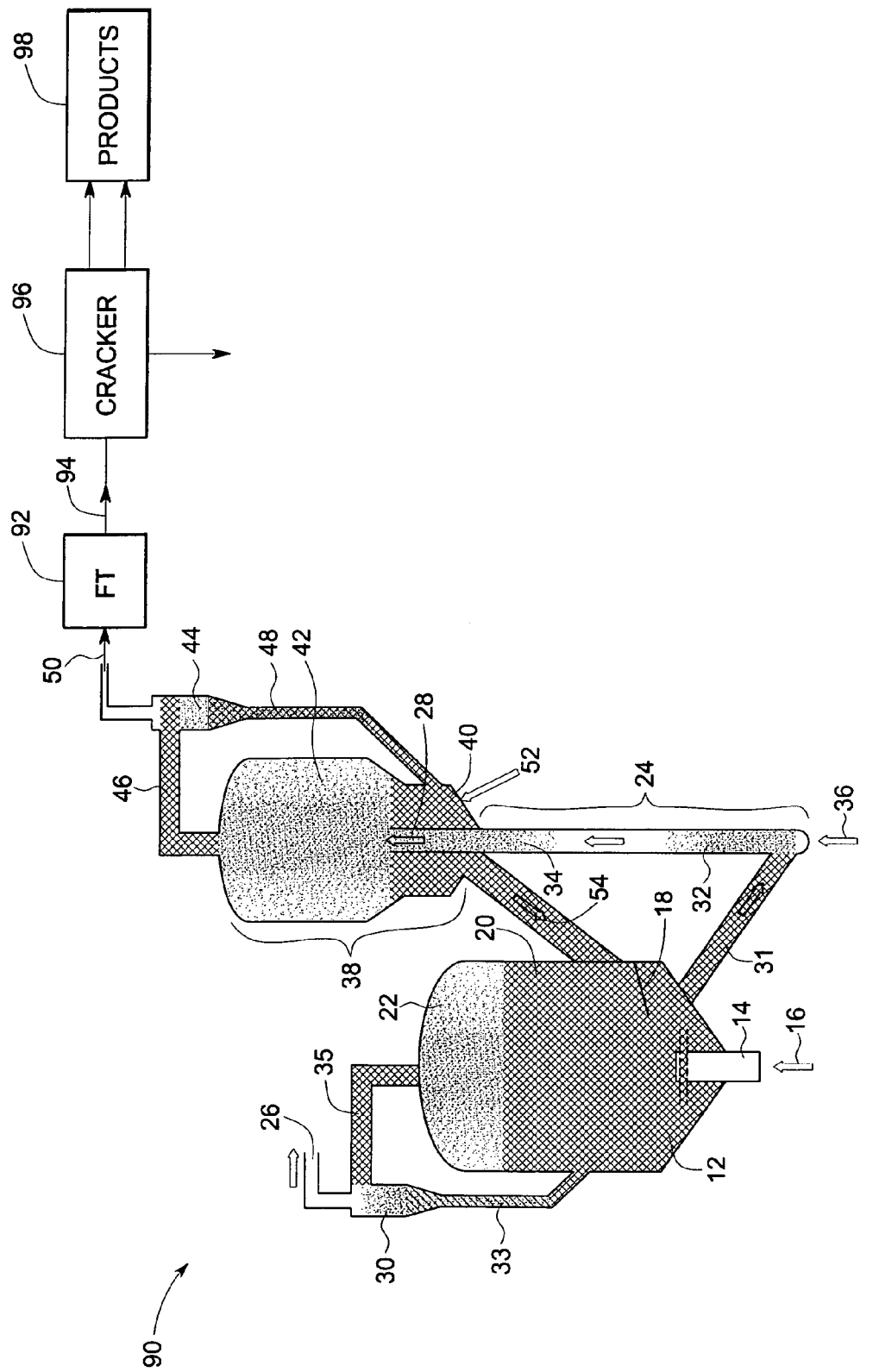

FIG. 4 is yet another exemplary system for production of synthesis gas wherein the synthesis gas produced is used in a Fichser-Tropsh (FT) process. In one embodiment, the synthesis gas 50 comprising hydrogen and the carbon monoxide is introduced into the Fischer-Tropsh processing unit 92 and, through catalysis, are recombined into long-chain liquid hydrocarbons. Finally, in a refining system 96, the liquid hydrocarbons are converted and fractionated into products 98 that can be used immediately, are readily transportable and can be blended easily to form products such as synthetic diesel fuel, synthetic kerosene, ethanol, dimethyl ether, naphtha or combinations or derivates thereof.

As discussed above, one issue with conventional gas to liquid (GTL) systems is that they are complex, inefficient and have an extremely large footprint. The systems described herein lower the overall complexity of synthesis gas generation processes; improve the operating efficiencies of these processes; and provide a much simpler and smaller overall footprint for synthesis gas production systems.

The systems for production of synthesis gas described herein have many advantages. In the disclosed systems for synthesis gas production, the capital and operation and maintenance (O&M) costs are significantly lowered as the requirement of the air separation plant is eliminated. Furthermore, the compact systems as shown in FIGS. 1-4 for generation of synthesis gas do not typically include any moving parts thereby increasing the reliability and the life of the systems. In conventional CPO systems there is typically a risk that the temperature will rise above the catalyst tolerance temperature. Since the maximum amount of oxygen provided for the CPO zone 32 is limited by the amount of OTM utilized, the inherent risk of any CPO process having a temperature above the catalyst tolerance limit can be limited. Furthermore in the disclosed systems, the OTM advantageously accomplish several different functions as described above.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A system for producing synthesis gas comprising:
   a regeneration zone comprising a first fluidized bed configured to receive an oxidant for producing a regenerated oxygen transfer material;
   a mixed reforming zone comprising a second fluidized bed configured to receive a first fuel and said regenerated oxygen transfer material to produce a first reformate stream; and
   a steam reforming zone comprising a third fluidized bed configured to receive said first reformate stream, steam and a second fuel to produce said synthesis gas;
   wherein said regeneration zone, mixed reforming zone and steam reforming zone are in fluid communication.

2. The system of claim 1, wherein said oxygen transfer material is a metal oxide or mixtures of metal oxides.

3. The system of claim 1, wherein said oxygen transfer material is used for oxygen transfer function only.

4. The system of claim 1, wherein said oxygen transfer material comprises a catalyst for steam reforming reactions.

5. The system in claim 1, wherein said oxygen transfer material further comprises a $CO_2$ adsorption material.

6. The system in claim 5, wherein said $CO_2$ adsorption material is a metal oxide or mixtures of metal oxides.

7. The system in claim 6, wherein said $CO_2$ adsorption material comprises calcium oxide (CaO).

8. The system of claim 1, wherein said oxygen transfer material comprises at least one metal selected from the group consisting of Ni, Mg, Mo, Mn, Fe, Cr, Cu Zn, Co, Ce, and combinations thereof.

9. The system of claim 4, wherein said oxygen transfer material comprises nickel oxide configured to act in oxygen transfer and as said catalyst in steam reforming reactions.

10. The system of claim 4, wherein said catalyst comprises at least one catalytically active metal selected from the group consisting of Rh, Pt, Pd, Ru, Ir, Os and combinations thereof.

11. The system of claim 1, wherein said oxygen transfer material is configured to perform at least one function selected from the group consisting of oxygen transfer function, $CO_2$ adsorption function, catalytic partial oxidation function, steam reforming function and combinations thereof.

12. The system of claim 4, wherein said catalyst is produced by a spry-drying process followed by calcination at the temperature range of about 500 Deg. C. to about 1100 Deg. C.

13. The system of claim 4, wherein particles of said catalyst are in the range of about 10 microns to about 300 microns.

14. The system of claim 4, wherein particles of said catalyst are in the range of about 40 microns to about 150 microns.

15. The system of claim 5, wherein said $CO_2$ adsorption material is configured to capture $CO_2$ in the steam reforming zone releasing heat of $CO_2$ adsorption.

16. The system of claim 15, wherein said heat of $CO_2$ adsorption drives endothermic steam reforming reaction in said steam-reforming zone.

17. The system of claim 1, wherein said mixed reforming zone comprises a catalytic partial oxidation (CPO) zone and a steam reforming zone and said steam reforming zone uses the heat provided by said CPO zone to drive endothermic steam reforming reaction.

18. The system of claim 17, wherein said oxygen transfer material is configured to donate oxygen for said CPO zone to produce hydrogen ($H_2$), carbon monoxide (CO) and water ($H_2O$).

19. The system of claim 1, wherein said first fuel is selected from the group consisting of natural gas, methane, methanol, ethanol, ethane, liquid petroleum gas (LPG), naphtha, butane, propane, diesel, kerosene, an aviation fuel, a coal derived fuel, a bio-fuel, gas oil, crude oil, an oxygenated hydrocarbon feedstock, refinery off gas, associated gas and mixtures thereof.

20. The system of claim 1, wherein said oxygen transfer material is introduced into said mixed zone through gravity flow.

21. The system of claim 1, wherein said mixed reforming zone comprises a riser reactor.

22. The system of claim 21, wherein said riser reactor comprises a first portion and a second portion.

23. The system of claim 22, wherein said first portion is configured to facilitate CPO reaction and said second portion is configured to facilitate CPO and steam reforming reactions.

24. The system of claim 1 further comprising a first solid separation unit in fluid communication with said regeneration zone and a second solid separation unit in fluid communication with said steam-reforming zone.

25. The system of claim 24, wherein said first solid separation unit and second solid separation unit each comprises a cyclone separator.

26. The system of claim 1, wherein said oxidant is selected from air, oxygen depleted air and oxygen enriched air.

27. The system of claim 1, wherein said synthesis gas is used for Fischer-Tropsch process or production of hydrogen.

28. A system for producing synthesis gas comprising:
a regeneration zone comprising a first fluidized bed configured to receive an oxidant for producing a regenerated oxygen transfer material;
a mixed reforming zone comprising a second fluidized bed configured to receive a first fuel steam and said regenerated oxygen transfer material to produce a first reformate stream; and
a steam reforming zone comprising a third fluidized bed configured to receive said first reformate stream, a second fuel and steam to produce said synthesis gas;
wherein said regeneration zone, mixed zone and steam reforming zone are in fluid communication and said synthesis gas is used for Fischer-Tropsch process.

29. A system for producing hydrogen comprising:
a regeneration zone comprising a first fluidized bed configured to receive an oxidant for producing a regenerated oxygen transfer material;
a mixed reforming zone comprising a second fluidized bed configured to receive a first fuel steam and said regenerated oxygen transfer material to produce a first reformate stream; and
a steam reforming zone comprising a third fluidized bed configured to receive said first reformate stream, a second fuel and steam to produce a synthesis gas;
a shift reaction zone configured to receive said synthesis gas and steam to produce a second reformate rich in hydrogen; and
a separation unit configured to receive said second reformate and produce a substantially pure hydrogen gas;
wherein said regeneration zone, mixed zone and steam reforming zone are in fluid communication.

30. A method for producing a synthesis gas comprising;
regenerating an oxygen transfer material using an oxidant in a regeneration zone comprising a first fluidized bed;
producing a first reformate in a mixed reforming zone comprising a second fluidized bed configured to receive a first fuel steam and a regenerated oxygen transfer material; and
steam reforming said first reformate in a steam reforming zone comprising a third fluidized bed configured to receive a second fuel and steam to produce said synthesis gas;
wherein said regeneration zone, mixed zone and steam reforming zone are in fluid communication.

* * * * *

UNITED STATES PATENT AND TRADEMARK OFFICE
CERTIFICATE OF CORRECTION

PATENT NO. : 7,540,893 B2 Page 1 of 1
APPLICATION NO. : 11/295403
DATED : June 2, 2009
INVENTOR(S) : Liu et al.

It is certified that error appears in the above-identified patent and that said Letters Patent is hereby corrected as shown below:

In Column 2, Line 27, insert -- BRIEF --, before "DESCRIPTION" in Heading.

In Column 4, Line 12, in Equation "(2)" delete "CH4+1.5O2=CO+2H2O" and insert -- $CH_4+1.5O_2=CO+2H_2O$ --, therefor.

In Column 10, Line 43, in Claim 30, delete "comprising;" and insert -- comprising: --, therefor.

Signed and Sealed this

Twenty-second Day of September, 2009

David J. Kappos
*Director of the United States Patent and Trademark Office*